United States Patent

Eggert, Jr.

[15] 3,673,675

[45] July 4, 1972

[54] METHOD OF ASSEMBLYING A VEHICLE BODY

[72] Inventor: Walter S. Eggert, Jr., Huntingdon Valley, Pa.

[73] Assignee: Boothe Airside Systems, Inc.

[22] Filed: Nov. 3, 1969

[21] Appl. No.: 873,422

[52] U.S. Cl. .................... 29/469, 29/470.5, 296/28.2
[51] Int. Cl. ........................................... B23p 21/00
[58] Field of Search ............... 29/449, 463, 469, 470.5; 296/28.2, 28.8

[56] References Cited

UNITED STATES PATENTS

| | | | |
|---|---|---|---|
| 2,172,571 | 9/1939 | Theriault | 296/28.2 |
| 2,679,431 | 5/1954 | Wineman | 296/28.2 |
| 2,832,131 | 4/1958 | Leitner et al. | 29/469 |
| 3,461,819 | 8/1969 | Eggert | 29/469 X |

FOREIGN PATENTS OR APPLICATIONS

| | | | |
|---|---|---|---|
| 1,077,689 | 3/1960 | Germany | 29/469 |

*Primary Examiner*—Charlie T. Moon
*Attorney*—Stowell & Stowell

[57] ABSTRACT

A method for assemblying a vehicle body that is manufactured in two equal but opposite half sections about a longitudinal center line. This method provides welded frame, riveted and adhesive bonded skin for supporting portions of the load as shear panels, and cross bears and bolsters for supporting the body on running gear.

5 Claims, 15 Drawing Figures

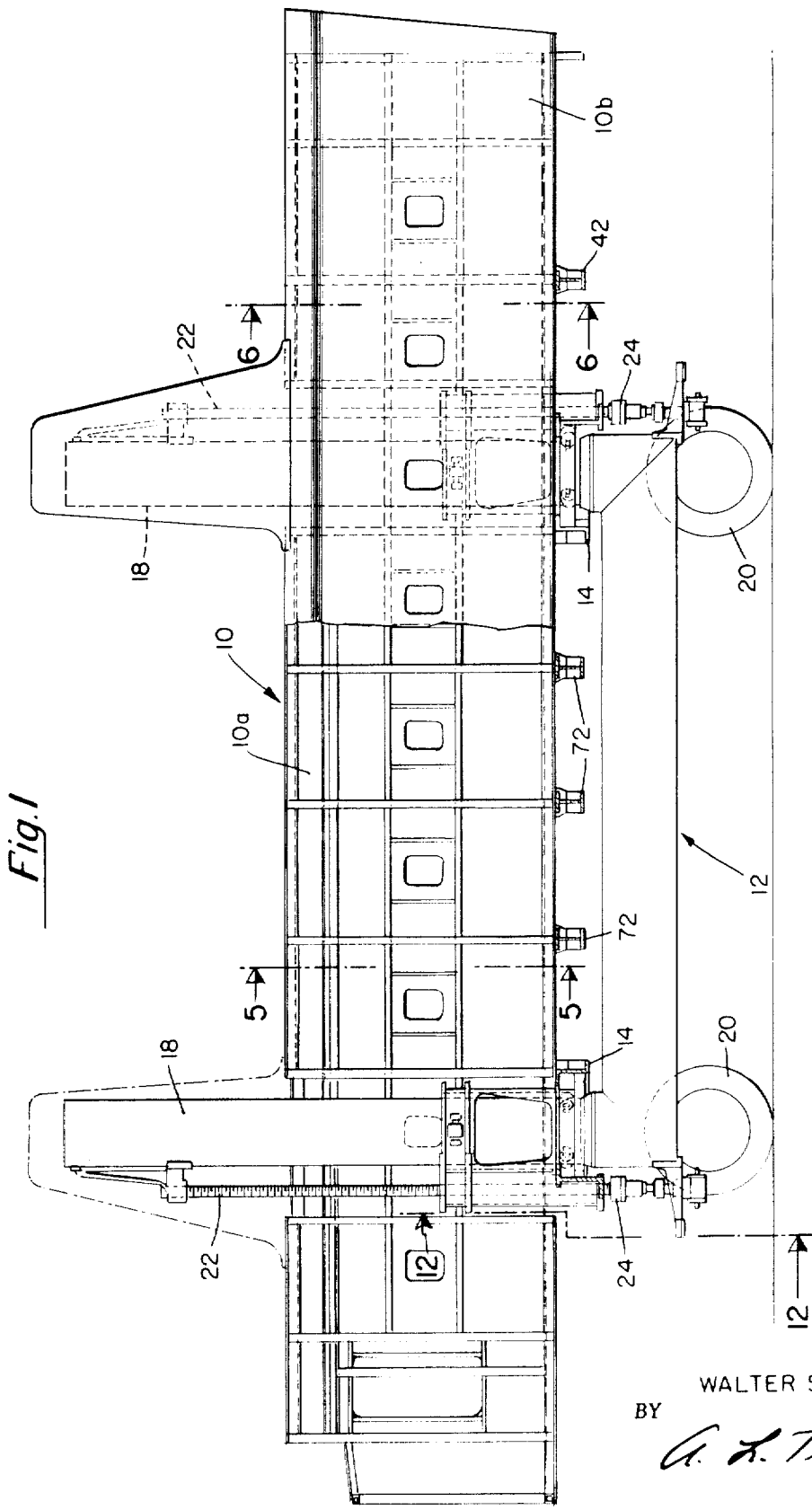

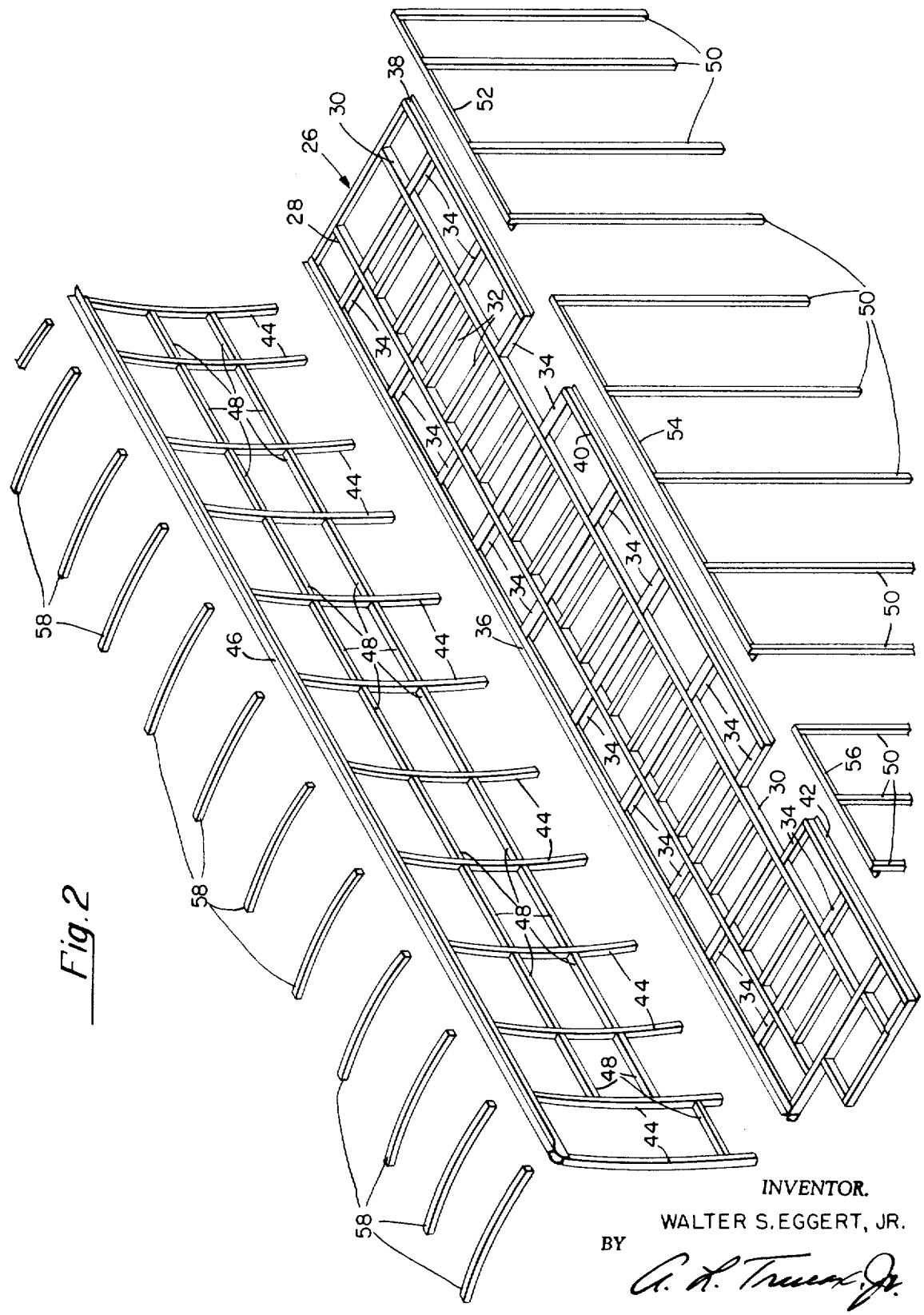

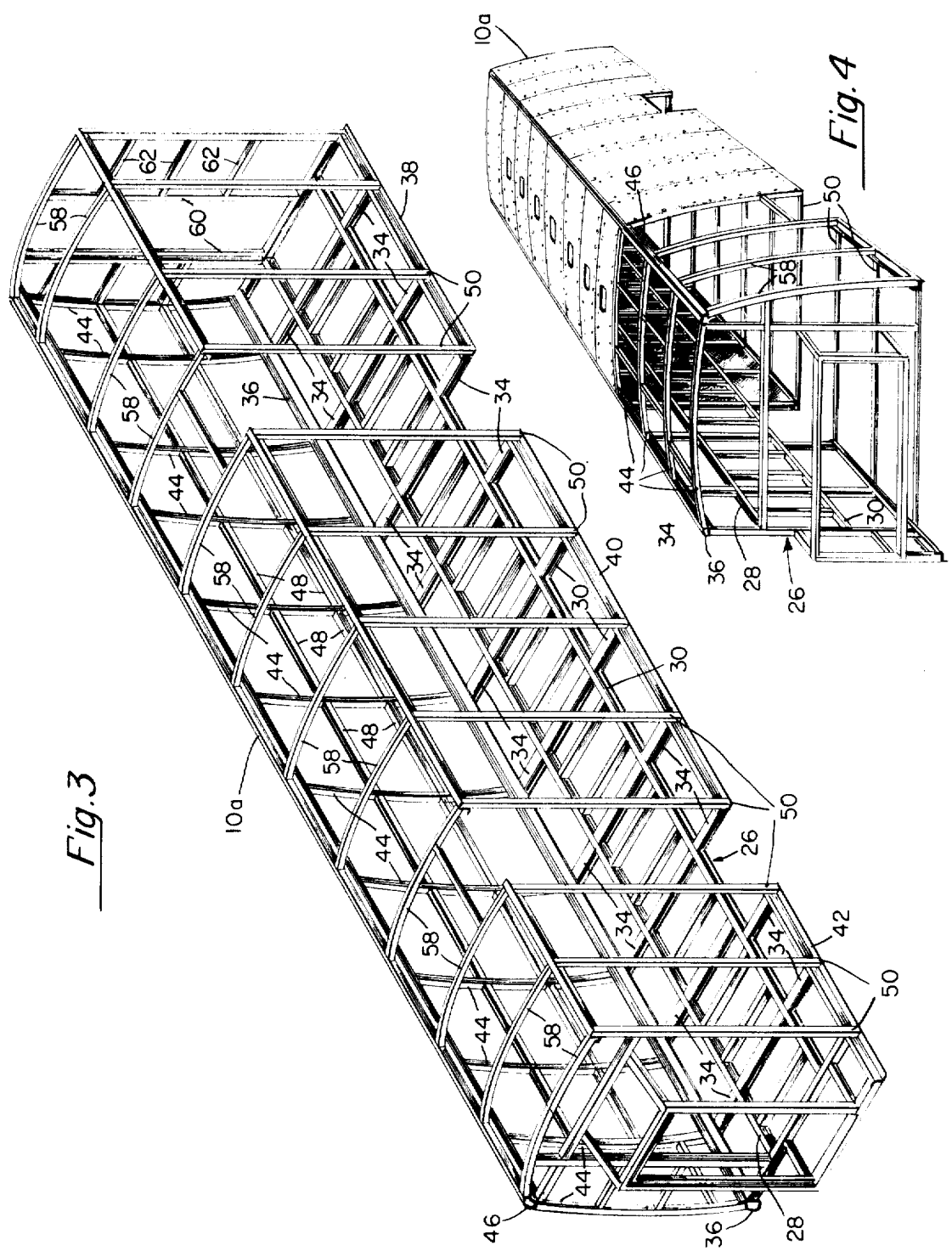

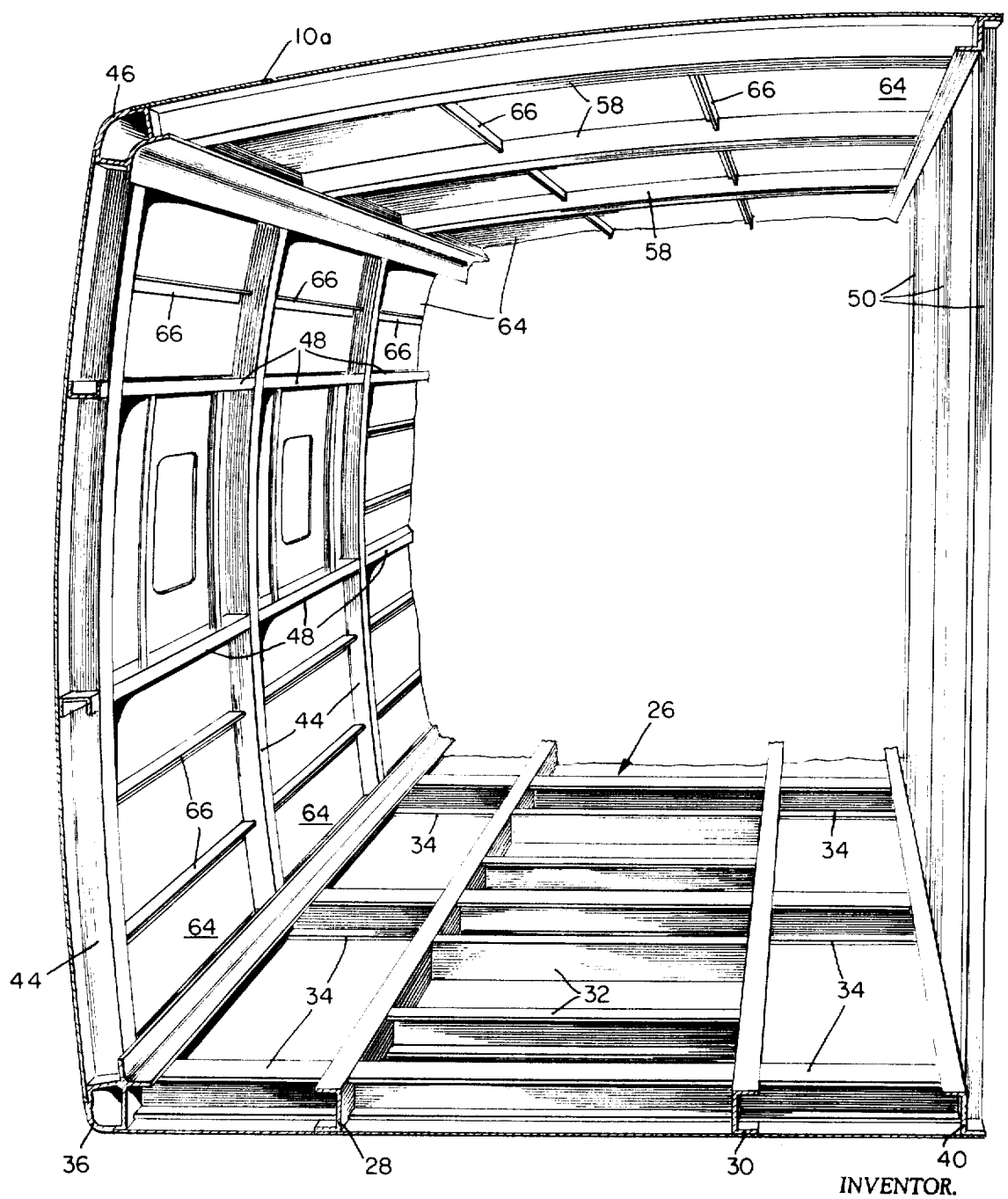

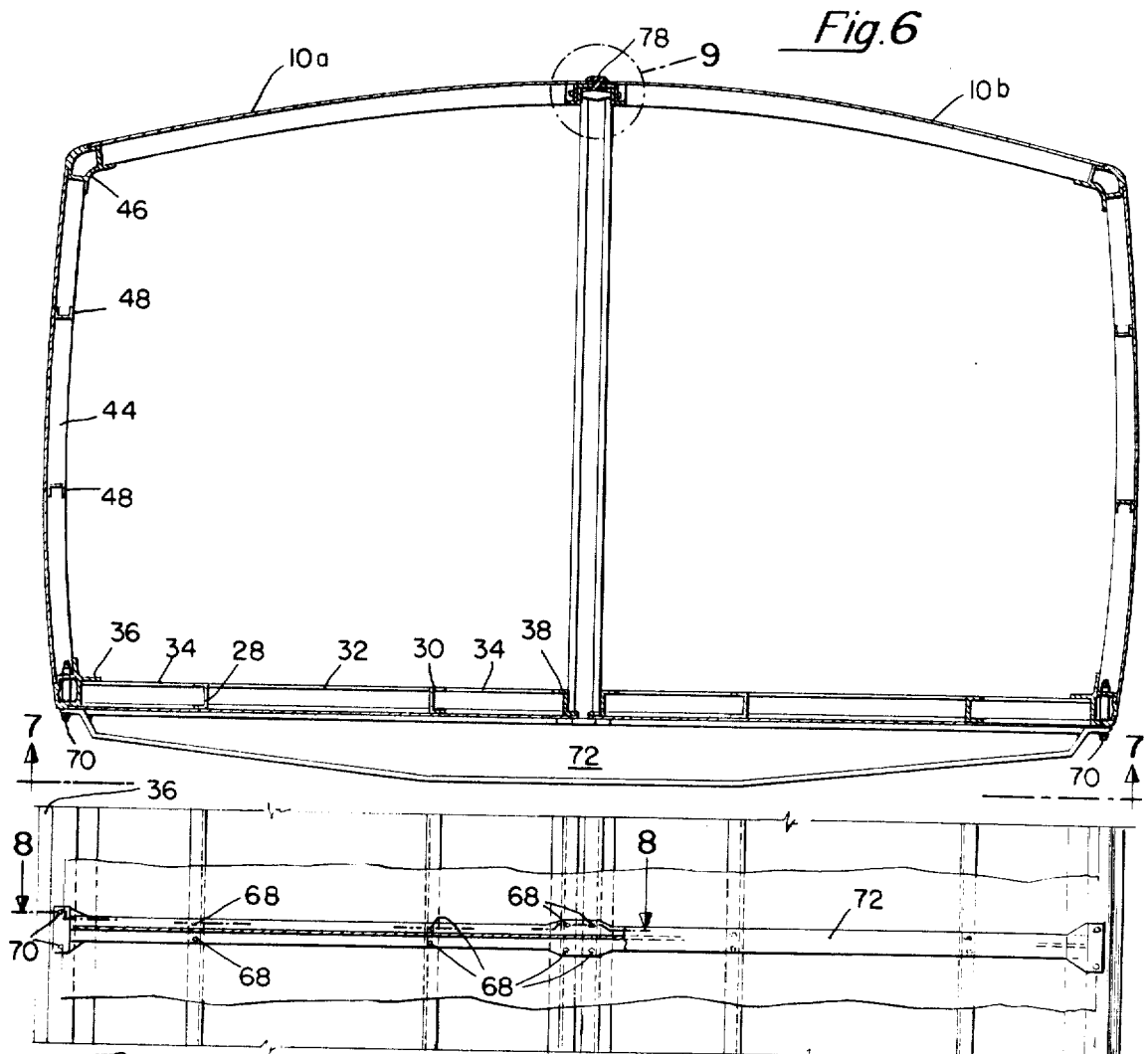
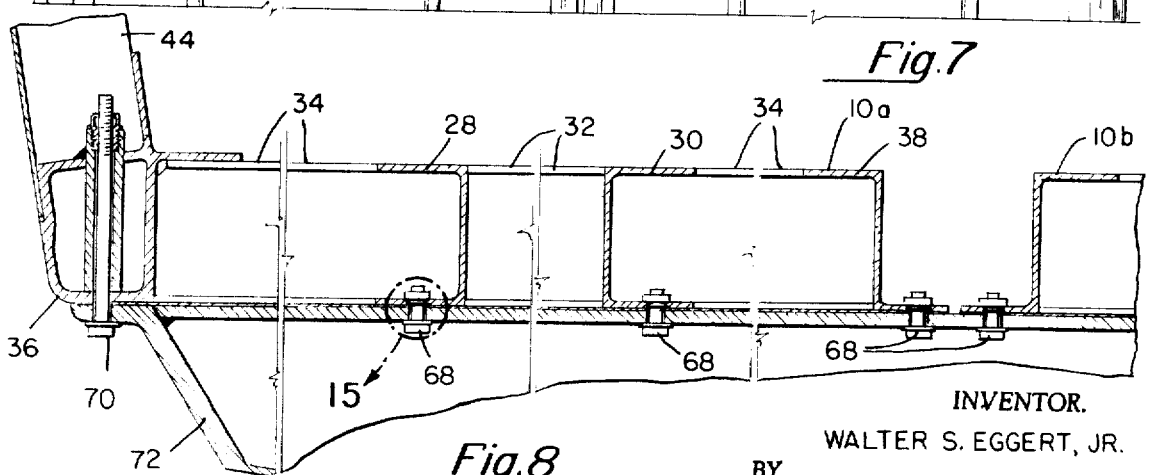

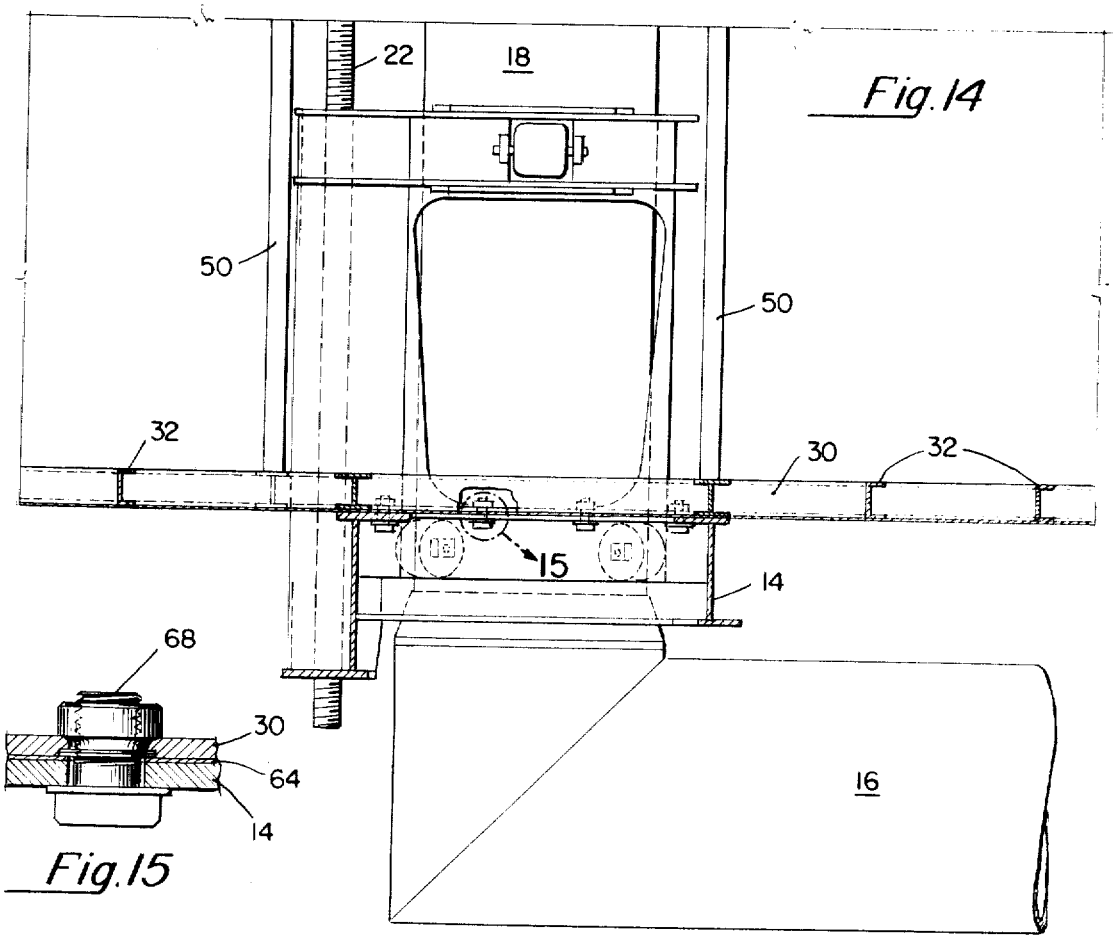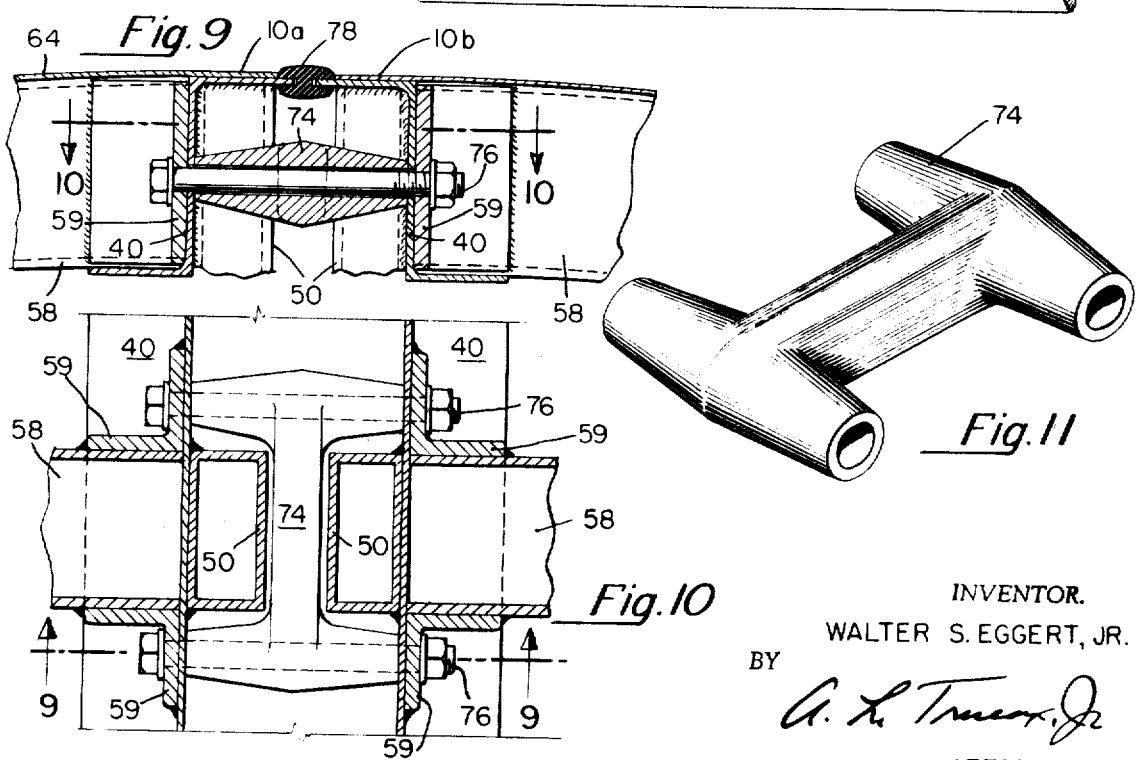

INVENTOR.
WALTER S. EGGERT, JR.

METHOD OF ASSEMBLYING A VEHICLE BODY

This invention relates to a method of manufacturing a vehicle body but more particularly to a method of manufacturing a vehicle body in half sections and then joining the fabricated half sections into a complete body on supporting bolster assemblies.

The conventional method of vehicle body assembling generally begins with a frame structure on which the body is built by adding components "from the ground up" until the body is completed. The present method requires the body to be manufactured as two half sections, each half is fabricated by welding a frame structure, sheathing the frame with a skin by riveting and adhesive bonding the skin to the welded frame so that the skin not only covers the frame but also acts as shear panels for structural strength. Then mounting the two halves on supporting bolster assemblies of the vehicle and joining the two half sections together by bolts. A plurality of cross bears are bolted to the bottom of the body to strengthen the body and transfer center loading to the side walls. The top center sections are bolted together by "H" shaped spacers and a seal that weather proofs the joint between the two halves.

An object of this invention is to provide a new method of assembling a vehicle body by providing two half sections that can more easily be transported to an assembly point and that will provide a structurally sound vehicle body when assembled.

This and other objects of this invention will become evident as reference is made to the following specification and drawing.

FIG. 1 is a side view, with sections broken away, showing the completed vehicle body mounted on the supporting frame;

FIG. 2 is an exploded isometric view of half of the vehicle body structure components prior to being welded into the frame structure;

FIG. 3 is an isometric view of the body components of FIG. 2 welded into the frame structure for half the vehicle body;

FIG. 4 shows the vehicle body half resting on the stanchions as the outer skin is applied to the welded frame structure;

FIG. 5 is a view in the direction of the arrows substantially along line 5—5 of FIG. 1 showing half of the vehicle body without any interior trim;

FIG. 6 is a view in the direction of the arrows, substantially along line 6—6 of FIG. 1, illustrating a cross section of the vehicle body;

FIG. 7 is a view in the direction of the arrows, substantially along line 7—7, with portion cut away to show the manner in which the vehicle body is secured to the cross bolsters;

FIG. 8 is a view in the direction of the arrows, substantially along line 8—8 of FIG. 7 illustrating the bolting attachment of the vehicle body to the cross bolster;

FIG. 9 is an enlarged view of the circled area 9 of FIG. 6, showing the spacer used in joining the ridge poles;

FIG. 10 is a view in the direction of the arrows substantially along line 10—10 of FIG. 9 illustrating the spacer straddling the stanchions;

FIG. 11 is an isometric view of the spacer;

FIG. 14 is a view in the direction of the arrows, substantially along the line 14—14 of FIG. 13, showing a side view of the vehicle body mounted on the bolster assembly;

FIG. 15 is an enlarged view of the circled area 15 of FIG. 14, illustrating an attaching bolt for securing the vehicle body on the supporting bolsters.

Figures 12, 13:
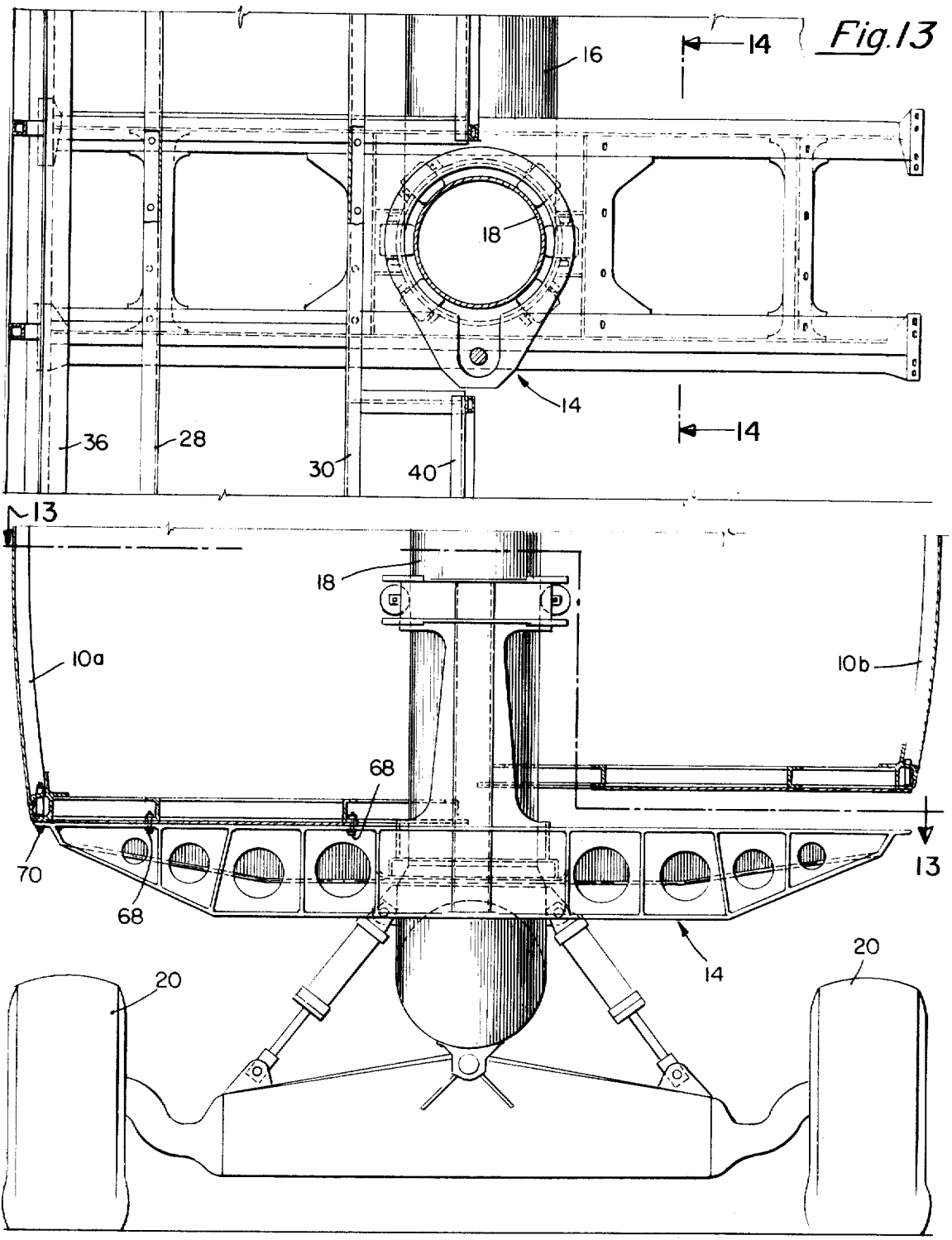
FIG. 12 is a view in the direction of the arrows, substantially along the line 12—12 of FIG. 1, showing one half of the vehicle body on the supporting bolsters and the other half being lowered into position.
FIG. 13 is a view in the direction of the arrows, substantially along the lines 13—13 of FIG. 12 illustrating the predrilled attaching holes of the bolster assembly for the half vehicle body being lower and the attaching bolts of the positioned half of the vehicle body.

Referring now to the drawings, as best seen in FIG. 1, a vehicle body 10 is supported on a vehicle frame 12 by a pair of bolster assemblies 14.

The vehicle frame 12 includes a main central beam 16 having lifting posts 18 connected to each end and extending vertically therefrom. The frame 12 is mounted on wheels 20 for moving the vehicle from place to place and drive shafts 22 are connected to a reversible power source (not shown) for moving the supporting bolster assemblies 14 vertically along the lifting posts 18 to adjust the height of the vehicle body 10. The vertical adjustment is accomplished by having the threaded vertical drive shafts 22 rotate within cooperating lift nuts 26 which contact the bolster assemblies 14 and move the bolster assemblies and the supported vehicle body vertically along the lifting posts 18 to the desired position as the drive shafts 22 are rotated.

The vehicle body 10 is designed for longitudinal separation along the center line and consists of identical but opposite halves 10a and 10b. For ease of explanation only the method of assembly for one half section 10a of the vehicle body 10 will be described. The assembly of two halves to complete the body will be described.

As best seen in FIGS. 2 and 3, the frame of the body includes a floor ladder structure 26 having a pair of longitudinal stringers 28, 30 joined by a plurality of rung type cross members 32. A plurality of side extensions 34 extend transversely from the ladder stringers 28, 30. The side extensions 34 from stringer 28 are secured to a lower outside stringer 36 and the side extensions from stringer 30 are secured to one of the "Z" shaped center longitudinal stringers 38, 40, 42. The combined ladder structure, side extensions, lower outside stringer and center longitudinal stringers form the support structure for the vehicle floor.

The exterior side structure includes a plurality of side posts 44 secured to and extending substantially vertically from the lower outside stringer 36. The upper ends of the side posts 44 are secured to an upper outer stringer 46. A plurality of side rails 48 are connected between the side post 44 to reinforce the side structure.

Secured to and extending vertically from the center longitudinal stringers 38, 40, 42 are a plurality of stanchions 50. The upper ends of the stanchions 50 are secured to "Z" shaped ridge poles 52, 54, 56.

Extending between and secured to the upper outer stringer 46 and the ridge poles 52, 54, 56 are a plurality of carlines 58 which form the support for the vehicle body roof. To the center end portion of each carline 58, a reinforcement angle 59 is secured on each side to reinforce the carline 58 and the associated ridge pole when the half sections are joined.

The end portions of the body frame are completed by vertical end posts 60 extending between and connected to the ladder structure 26 and the end carline 58. Horizontal reinforcing end rails 62 are connected between the end posts 60 and adjacent side posts 44 and stanchion 50 as required.

The frame of the body structure described thus far is preferably joined by welding but other means of joining such as bolting or high strength adhesives may be used as desired.

Once the frame has been assembled, as seen in FIG. 3, the structure is placed on the stanchions 50, as seen in FIG. 4, and the skin panels 64 are positioned on the frame and predrilled. The panels 64 are then removed and a bonding agent applied to the areas of contact with the body structure. Then the panels 64 are repositioned and blind rivets utilized to secure the panels to the frame and hold them in place while the bonding agent cures. Each of the skin panels 64 is provided with reinforcement angle strips 66 for assisting the panels 64 as they accept loads as shear panels incorporated in the body structure.

Referring now to FIGS. 12, 13, 14 and 15, after the skin panels have been secured to the frame, first one body half 10a is lowered on the supporting bolster structure 14 and secured there by bolts 68 which secure the ladder structure portion 26 to the bolster assemblies 14 and by bolts 70 which secure the lower outside stringer 36 portion to the bolster assemblies 14.

Then the other half 10b is lowered and secured to the bolster structure 14. Details of the attaching bolts 68 are seen in FIG.

15. When the vehicle body 10 is secured to the bolster assemblies 14, cross bears 72 are secured along the bottom of the vehicle body by bolts 68 for transferring loads imposed thereupon to the side structure through side bolts 70, see FIGS. 7 and 8, which secure the cross bears 72 to the lower outside stringers 36. The cross bears 72 also control the width of the floor of the vehicle body.

Referring now to FIGS. 9, 10 and 11, the upper center sections of the body halves 10a and 10b are secured to each other by a plurality of "H" shaped spacers 74 and bolts 76. The "H" spacers 74 encircle a stanchion 50 from each body half and the bolts 76 extend through the adjacent center longitudinal stringers 40, the reinforcement angles 59 of the carlines and an arm of the spacer 74. A sealer strip 78 of rubber or plastic is positioned between the adjacent edges of the center longitudinal stringers to weather proof this joint between the two halves of the body.

Thus it can be seen that the body may be easily assembled by building two separate half sections and joining the half sections as the final assembly of the body.

What is claimed is:

1. A method of manufacturing a vehicle body for a vehicle having supporting bolsters for receiving said body, said body being manufactured as two half sections as divided along the longitudinal center line of said body, including the steps of:
   a. fabricating two frames each including a floor structure, an outer side structure, a roof structure, an end structure, and an inner side support structure,
   b. attaching to each of the two frames an outer skin to the floor structure, side structures, end structures, and roof structure,
   c. placing the two frames adjacent each other, with their inner sides facing each other and now defining a center for the vehicle body, said frames resting on and secured to supporting bolsters.

2. The method of manufacturing a vehicle body as claimed in claim 1 wherein in step (a) the frame is fabricated by welding and, in step (c) the structures are welded to each other for forming a completely welded frame structure.

3. The method of manufacturing a vehicle body as claimed in claim 2 wherein the outer skin is both adhesively bonded and riveted to the welded frame structure.

4. The method of manufacturing a vehicle body as claimed in claim 1 further including:
   a. positioning spacers between the half sections adjacent the roof structure and contacting each inner side support structure,
   b. said spacers being H-shaped with their legs straddling inner side stanchion members.

5. A method of manufacturing a vehicle body comprised of two half sections, including the following steps:
   a. fabricating a floor ladder structure for each of the two half sections,
   b. completing the floor structure for each of the two half sections by securing stub beams to the sides of the ladder structure to form floor supports and then securing a lower longitudinal side stringer along one side of the floor supports and center longitudinal stringers along the other side of the floor supports,
   c. forming the side structure for each of the two half sections by securing the tops of side posts to an upper longitudinal side stringer, securing side rail reinforcements between the side posts and then securing the bottom of the side posts to a lower longitudinal side stringer,
   d. securing one end of each of a plurality of stanchions to a ridge pole and securing the other end of each of said stanchions to a center longitudinal stringer for each of the two half sections,
   e. positioning and securing carlines between the upper longitudinal side stringers and the ridge poles for each of the two half sections,
   f. fabricating and attaching end structures for each of the two half sections,
   g. attaching an outer skin to each half section structure,
   h. positioning each half section on supporting bolsters, and securing the half sections to each other and to the supporting bolsters.

* * * * *